(12) United States Patent
Tebje et al.

(10) Patent No.: US 9,791,273 B2
(45) Date of Patent: Oct. 17, 2017

(54) MICROMECHANICAL SENSOR

(71) Applicant: Robert Bosch GmbH, Stuttgart (DE)

(72) Inventors: Lars Tebje, Reutlingen (DE); Chunyu Wang, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 330 days.

(21) Appl. No.: 14/468,204

(22) Filed: Aug. 25, 2014

(65) Prior Publication Data

US 2015/0053000 A1 Feb. 26, 2015

(30) Foreign Application Priority Data

Aug. 26, 2013 (DE) .................. 10 2013 216 907

(51) Int. Cl.
*G01C 19/56* (2012.01)
*G01C 19/5712* (2012.01)

(52) U.S. Cl.
CPC ......... *G01C 19/56* (2013.01); *G01C 19/5712* (2013.01); *Y10T 29/49826* (2015.01)

(58) Field of Classification Search
CPC .................... G01C 19/5712; G01P 2015/0882
USPC .............. 73/504.12, 504.04, 504.02, 514.32, 73/514.36, 514.37, 514.38
See application file for complete search history.

(56) References Cited

U.S. PATENT DOCUMENTS

| 2010/0024552 | A1* | 2/2010 | Foster | G01P 15/125 73/514.29 |
| 2012/0031185 | A1* | 2/2012 | Classen | G01P 15/125 73/514.14 |
| 2014/0083190 | A1* | 3/2014 | Kaack | G01P 15/125 73/514.14 |

* cited by examiner

*Primary Examiner* — Laura Martin
*Assistant Examiner* — Suman K Nath
(74) *Attorney, Agent, or Firm* — Norton Rose Fulbright US LLP; Gerard Messina

(57) ABSTRACT

A micromechanical sensor is provided having a substrate having a main plane of extension and having a movable element, the movable element being pivotable about an axis of rotation that is essentially parallel to the main plane of extension, from a rest position into a deflected position, the movable element having an asymmetrical mass distribution relative to the axis of rotation, so that, as a function of a force exerted on the movable element oriented essentially perpendicular to the main plane of extension, a deflection movement of the movable element is produced in the form of a pivot movement about the axis of rotation, the micromechanical sensor having a damping element, the damping element being pivotable about the axis of rotation,
  the damping element being connected to the movable element so as to be capable of rotational movement, or
  the damping element being integrated with the movable element.

12 Claims, 6 Drawing Sheets

MICROMECHANICAL SENSOR

FIELD OF THE INVENTION

The present invention is based on a micromechanical sensor.

BACKGROUND INFORMATION

Such micromechanical sensors (MEMS) are generally known. For example, such a micromechanical sensor is fashioned as an acceleration sensor, a rotational rate sensor, and/or a pressure sensor, a deflection of a movable element being capacitively detected. The micromechanical sensors are installed for example in a motor vehicle in the region of an engine in order to monitor operating parameters of the engine. Here, disturbing vibrational oscillations, which can disadvantageously influence a measurement made using the micromechanical sensor, can occur in a comparatively large frequency range.

SUMMARY

It is therefore an object of the present invention to improve the vibrational robustness of the micromechanical sensor with regard to a comparatively large frequency range.

The micromechanical sensor according to the present invention and the method according to the present invention for producing a micromechanical sensor have, in comparison to the existing art, the advantage that the vibrational robustness of the micromechanical sensor is improved in comparison with the existing art. The damping element pivotable about the axis of rotation, bound to the movable element in rotationally movable fashion, or the damping element pivotable about the axis of rotation and integrated with the movable element advantageously have the effect that a sensor structure is provided having improved vibrational robustness, configured for the detection of a force, in particular an acceleration force and/or Coriolis force, along a normal direction oriented essentially perpendicular to the main plane of extension of the substrate. Preferably, the movable element is situated on the substrate via a spring device so as to be capable of rotational movement, and can be deflected from the rest position into the deflected position. Preferably, the mass distribution of the movable element, a spring rigidity of one or more spring elements of the spring device, a damping parameter of the damping structure, and/or a damping parameter of the movable element is configured in such a way that the graph of a frequency response curve of a transfer function of the micromechanical component in a frequency range above a boundary frequency falls off more strongly than in a frequency range below the boundary frequency. In particular, the frequencies of the frequency response curve stand in a relation with a disturbing vibration, for example a vibrational oscillation. In this way, the vibrational robustness is advantageously increased in a particularly efficient manner.

The movable element is pivotable about an axis of rotation that is essentially parallel to the main plane of extension, from a rest position to a deflected position. This means for example that the movable element is situated on the substrate, using a torsion spring, so as to be rotationally movable. The torsion spring preferably has a torsion axis that extends along the axis of rotation.

Relative to the axis of rotation, the movable element has an asymmetrical mass distribution, so that as a function of a force, exerted on the movable element, that is oriented essentially perpendicular to the main plane of extension, a deflection movement of the movable element is produced in the form of a pivot movement about the axis of rotation. This means for example that the movable element has a first mass element and a second mass element, the first mass element having a first distance from the axis of rotation and the second mass element having a second distance from the axis of rotation, the masses of the first and second mass element and/or the first and second distance of the mass elements being different. The force is for example an acceleration force or Coriolis force that produces a rotational torque on the movable element. Preferably, the movable element has a main direction of extension along a direction, also referred to as the first direction or X direction, that is essentially parallel to the main plane of extension and essentially perpendicular to the axis of rotation.

Here, damping element means for example that the damping element is configured for mechanical damping and/or for dynamic air damping, such that in the case of a mechanical damping the amplitude of a deflection of the movable element is mechanically damped, the dynamic air damping including for example a sliding-film damping and/or a squeezed-film damping. For example, the damping element can also be referred to as the second element, configured in particular for mechanical damping of the amplitude of a rotational oscillation of the movable element.

According to a preferred development, it is provided that the movable element is a rocker structure, the rocker structure having a first partial mass and a second partial mass, the first and second partial mass being situated along a direction essentially parallel to the main plane of extension and essentially perpendicular to the axis of rotation and situated on different sides relative to the axis of rotation, the first partial mass and the second partial mass having different moments of inertia relative to the axis of rotation. In this way, it is advantageously possible to provide a micromechanical component having improved vibrational robustness, configured for the detection of a force acting on the movable element—i.e. for example an acceleration force or Coriolis force—along a Z direction or normal direction perpendicular to the main plane of extension.

According to a further preferred development, it is provided that the movable element is bound via a spring device to the substrate, the spring device being configured to produce a reset force as a function of a deflection of the movable element from the rest position. In this way, it is advantageously possible to easily use the spring device to dampen, in a targeted manner, particular disturbing vibrations that have a frequency in a particular frequency range. In this way, the vibrational robustness is improved in a particularly efficient manner.

According to a further preferred development, it is provided that the spring device has a first spring element anchored on the substrate in a first anchoring region, the movable element being bound to the substrate via the first spring element so as to be capable of rotational motion about the axis of rotation, the first spring element being in particular a torsion spring. In this way, it is advantageously possible to provide a micromechanical sensor that is both capable of detecting deflections of the movable element along the Z direction and also has a comparatively good vibrational robustness.

According to a further preferred development, it is provided that the spring device has a second spring element anchored on the substrate over a second anchoring region, and/or has a third spring element anchored on the substrate over a third anchoring region, in particular the second anchoring region and/or the third anchoring region being at a distance from the first anchoring region and/or from one another along the direction. According to a further preferred development, it is provided that the first spring element and/or the second spring element are flexible springs. In this way, it is advantageously possible to use additional second and third spring elements to dampen, in a targeted manner, particular disturbing vibrations having particular frequencies. In particular, in this way it is advantageously possible to specify the mass distribution of the movable element, a spring rigidity of one or more spring elements of the spring device, a damping parameter of the damping structure, and/or a damping parameter of the movable element, in such a way that the graph of a frequency response curve of a transfer function of the micromechanical component falls off more strongly in a frequency range above a boundary frequency than in a frequency range below the boundary frequency.

According to a further preferred development, it is provided that the movable element mainly extends essentially parallel to the main plane of extension, the spring device having two second spring elements and/or two third spring elements, the two second spring elements and/or the two third spring elements each being situated along a direction essentially parallel to the main plane of extension and essentially perpendicular to the axis of rotation, and situated mirror-symmetrically to one another relative to the axis of rotation. In this way, through the connection of the movable elements by, in each case, two second and/or third spring elements situated symmetrically to one another, in particular flexible springs, it is advantageously possible to suppress or dampen, in a targeted manner, disturbing vibrations having particular frequencies.

According to a further preferred development, it is provided that the damping element is connected to the movable element via a further first spring element, in particular a further torsion spring, so as to be rotationally movable,
  the damping element having a symmetrical mass distribution relative to the axis of rotation, or
  the damping element having an asymmetrical mass distribution relative to the axis of rotation, the mass centers of gravity of the movable element and of the damping element being situated, along the direction, on the same side or at regions that are essentially situated opposite one another, relative to the axis of rotation.

Preferably, if the two mass centers of gravity are situated on the same side along the direction, relative to the axis of rotation, then as a function of a force on the micromechanical element oriented along a normal direction, essentially perpendicular to the main plane of extension, pivot movements are produced of the movable element and of the damping element in the same direction. In contrast, if the two mass centers of gravity are situated on different sides along the direction, relative to the axis of rotation, then as a function of the force on the micromechanical element oriented along the normal direction, pivot movements of the movable element and of the damping element are produced in different directions. In this way, it is advantageously possible to bring about a damping of the deflection movement of the movable element in a particularly efficient manner using the damping element, which is connected to the movable element exclusively via the further torsion spring and so as to be capable of rotational motion. Preferably, the damping element here is connected to the substrate exclusively indirectly, in particular via the further torsion spring, the further torsion spring being connected to the substrate in particular exclusively indirectly via the movable element. In particular, the movable element is connected to the damping element via a torsion spring, the damping element being for example a beam element or a frame element, the beam element for example extending mainly parallel to the main plane of extension of the substrate and perpendicular to the axis of rotation, or the frame element surrounding the movable element at least partly or completely. Conversely, as an alternative to this, the movable element is fashioned as a frame element or beam element surrounding the damping element, and in particular in this case the movable element is an external structure and the damping element is an internal structure of the micromechanical element.

According to a further preferred development, it is provided that the damping structure includes a further damping element, the further damping element being connected in stationary fashion to the substrate, the first and second damping element each extending, in the rest position, essentially parallel to the main plane of extension, the first damping element and the second damping element being damping electrodes that interact capacitively with one another, the damping electrodes being fashioned as intermeshing comb structures or as surface electrodes that overlap along a direction of projection essentially perpendicular to the main plane of extension. In this way, it is advantageously possible to achieve a good vibrational robustness through squeezed-film damping and/or sliding-film damping using a comparatively simple damping structure.

DETAILED DESCRIPTION

Figure 1:
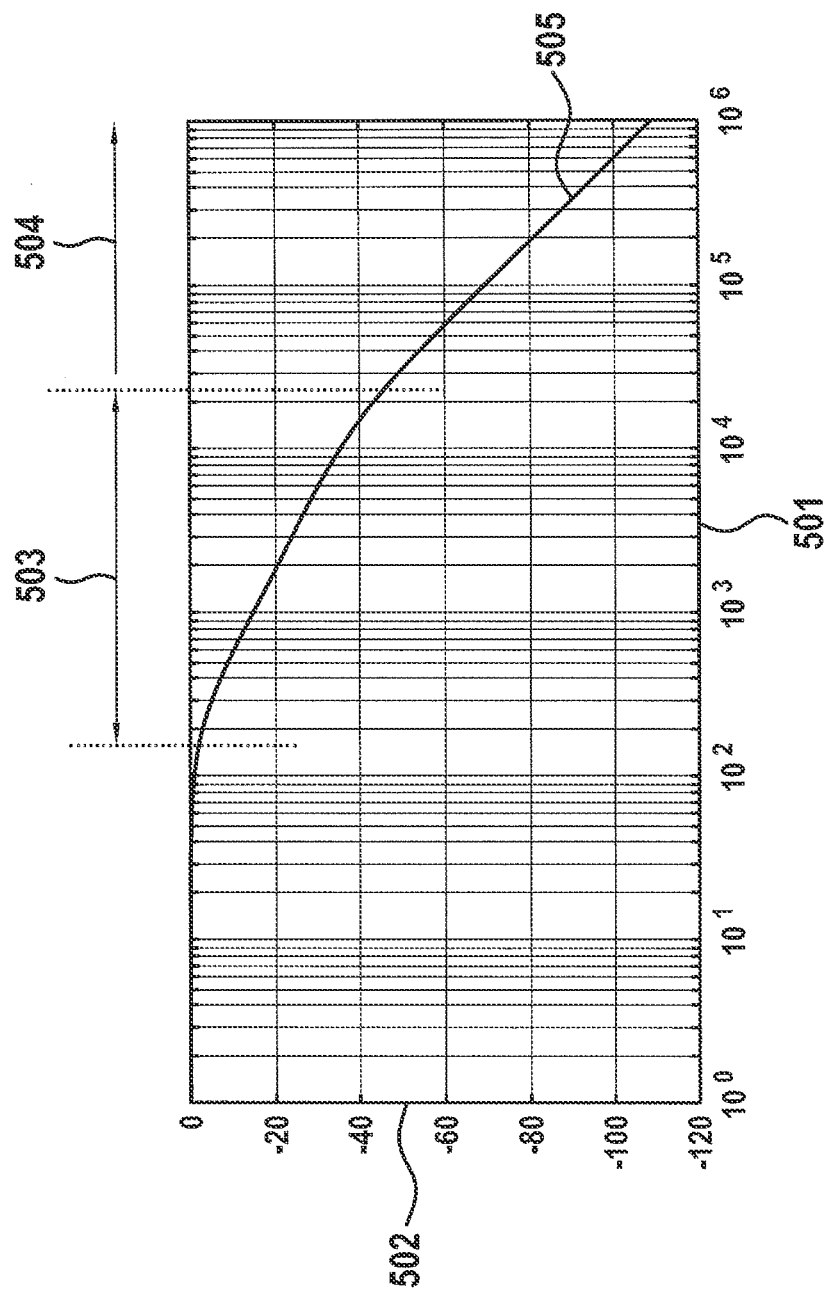
FIG. 1 shows a frequency response curve of a micromechanical sensor according to a specific embodiment of the present invention.

In the various Figures, identical parts have always been provided with identical reference characters, and are therefore as a rule only named or mentioned once.

FIG. 1 shows a frequency response curve 505 of a transfer function of a micromechanical sensor 1 according to a specific embodiment of the present invention. For example, micromechanical sensor 1 is a capacitive acceleration sensor 1 that is in particular a linear time-invariant (LTI) transmitting element as used in regulation technology, having a proportional transmission characteristic with second-order delay (so-called PT-2 element). Here, the transfer function of such a system can be written as:

$$F = (S^2 + 2DL\omega_0 S + \omega_0^2)^{-1}$$

where F is the transfer function, DL is the degree of damping, $\omega_0$ is the resonant frequency, and S is a variable that is a function of frequency. In FIG. 1, a frequency response curve 595 of micromechanical sensor 1 is shown as an example with a degree of damping of 5 and a resonant frequency of 2 kHz, amplitude 502 being shown in decibels as a function of frequency 501 in hertz (Hz). Here, two frequency ranges are indicated by arrows 503, 504. In a first, average frequency range 503, the rise of the frequency response curve in this example is approximately −20 dB/decade, and in a second, higher frequency range 504, in this example it is approximately −40 dB/decade. The rise is determined by the PT-2 element. According to the present invention, in the second, higher frequency range 504 a higher-order system is preferably realized, the vibrational robustness being realized for example by a rise having a larger magnitude in second frequency range 504.

Figure 2:
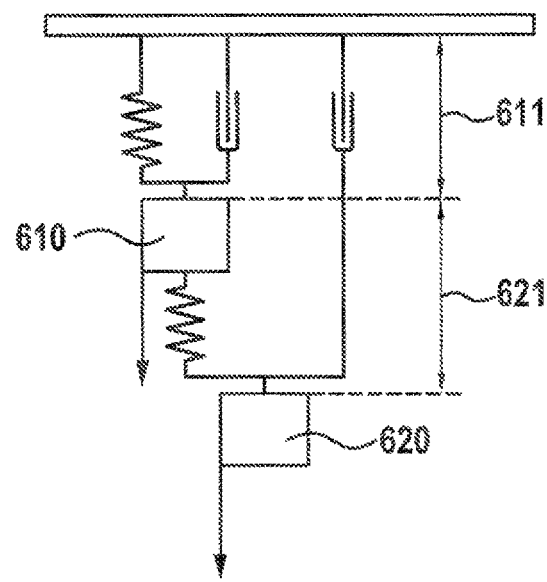
FIG. 2 shows a model of a double-mass system of a micromechanical sensor.

FIG. 2 shows a model of a double-mass system of a micromechanical sensor 1 having two movable masses 610, 620. Here, sensor 1 is configured for the detection of a first deflection 611 of a first mass 610 and a second deflection 621 of a second mass 620. A corresponding double-mass system is for example realized by a sensor 1 having sensitivity relative to Z direction 103, an additional polysilicon layer being situated along Z direction 103 between a substrate 10 and an epitaxially grown layer, and a symmetrical structure being realized, in particular a rocker structure 20 or a movable element 20, that is anchored centrally in a first anchoring region 30' on substrate 10. Here, movable element 20, or rocker structure 20, in a rest position has a distance from the substrate at a height of from 1 to 2 micrometers, preferably 1.3 to 1.8 micrometers, quite particularly preferably approximately 1.6 micrometers. By freeing the movable element in an etching method, the distance can be enlarged by approximately an order of magnitude.

Figure 3:
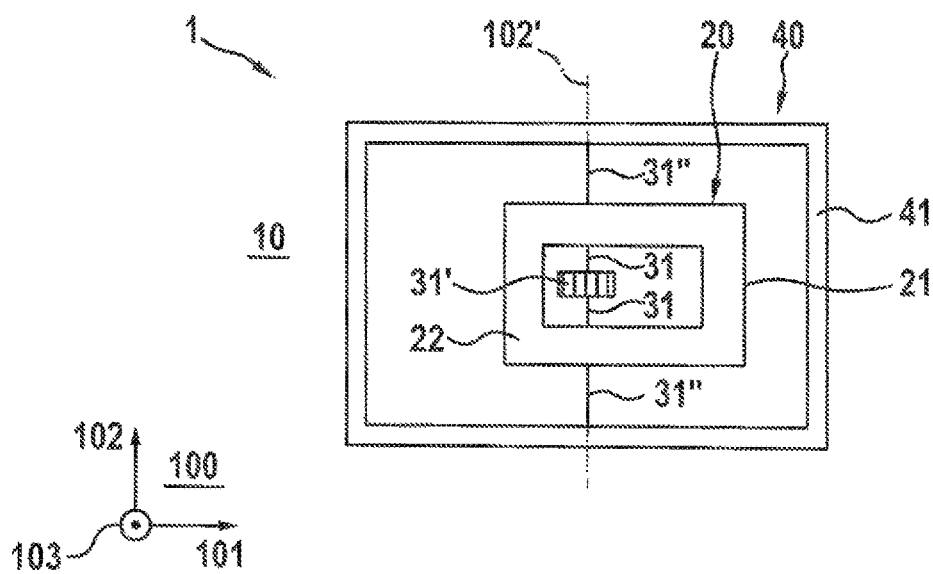
FIGS. 3 through 7 show various specific embodiments of a micromechanical sensor according to the present invention.

FIG. 3 shows a specific embodiment of micromechanical sensor 1 according to the present invention, in a top view. Micromechanical sensor 1 has a substrate 10 having a main plane of extension 100 and a movable element 20, movable element 20 being pivotable about an axis of rotation 102', essentially parallel to main plane of extension 100, from a rest position into a deflected position. Here, movable element 20 is anchored on substrate 10 by a first spring element 31, over a first anchoring region 31'. In particular, here first spring element 31 is a torsion spring 31, torsion spring 31 having a torsion axis, the torsion axis extending along axis of rotation 102'.

In addition, here movable element 20 has a mass distribution that is asymmetrical relative to axis of rotation 102', so that as a function of a force exerted on movable element 20 and oriented essentially perpendicular to main plane of extension 100, a deflection movement is produced of movable element 20 in the form of a pivoting movement about axis of rotation 102'. Here, the force is for example an acceleration force or a Coriolis force. Here the asymmetrical mass distribution is produced by an eccentric suspension of movable element 20, fashioned here as a frame structure—i.e., the overall mass center of gravity of movable element 20 as a whole is situated at a distance from axis of rotation 102'. This can be achieved for example in that movable element 20 has a homogenous mass density, the geometric shape of movable element 20 being asymmetrical relative to axis of rotation 102', and/or in that—for example despite symmetry of the geometrical shape of movable element 20 relative to axis of rotation 102'—the mass density of movable element 20 is asymmetrical relative to axis of rotation 102', the movable element having for example additional masses, different materials, and/or recesses.

In addition, the micromechanical sensor has a damping structure 40 having a damping element 41, the damping element being pivotable about axis of rotation 102', damping element 41 being connected to movable element 20 so as to be capable of rotational movement. Here, damping element 41 is for example fashioned as a frame structure completely surrounding movable element 20, the frame structure being fashioned symmetrically, with regard to mass density and geometrical shape, relative to the axis of rotation. Here, damping element 41 is connected in rotationally movable fashion to movable element 20 by a further torsion spring 31", further torsion spring 31" having a further torsion axis extending along axis of rotation 102'.

Figure 4:
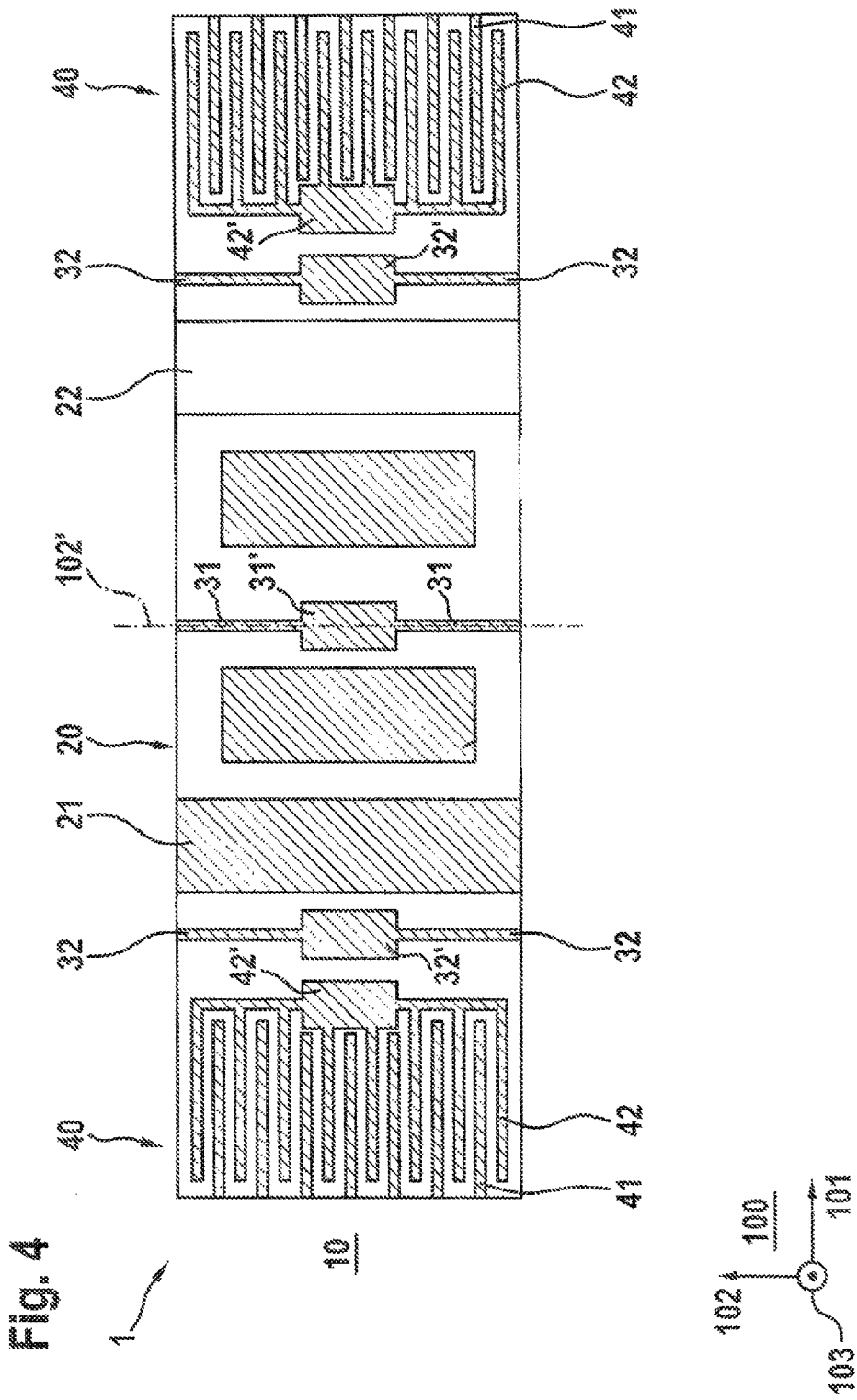
Figure 5:
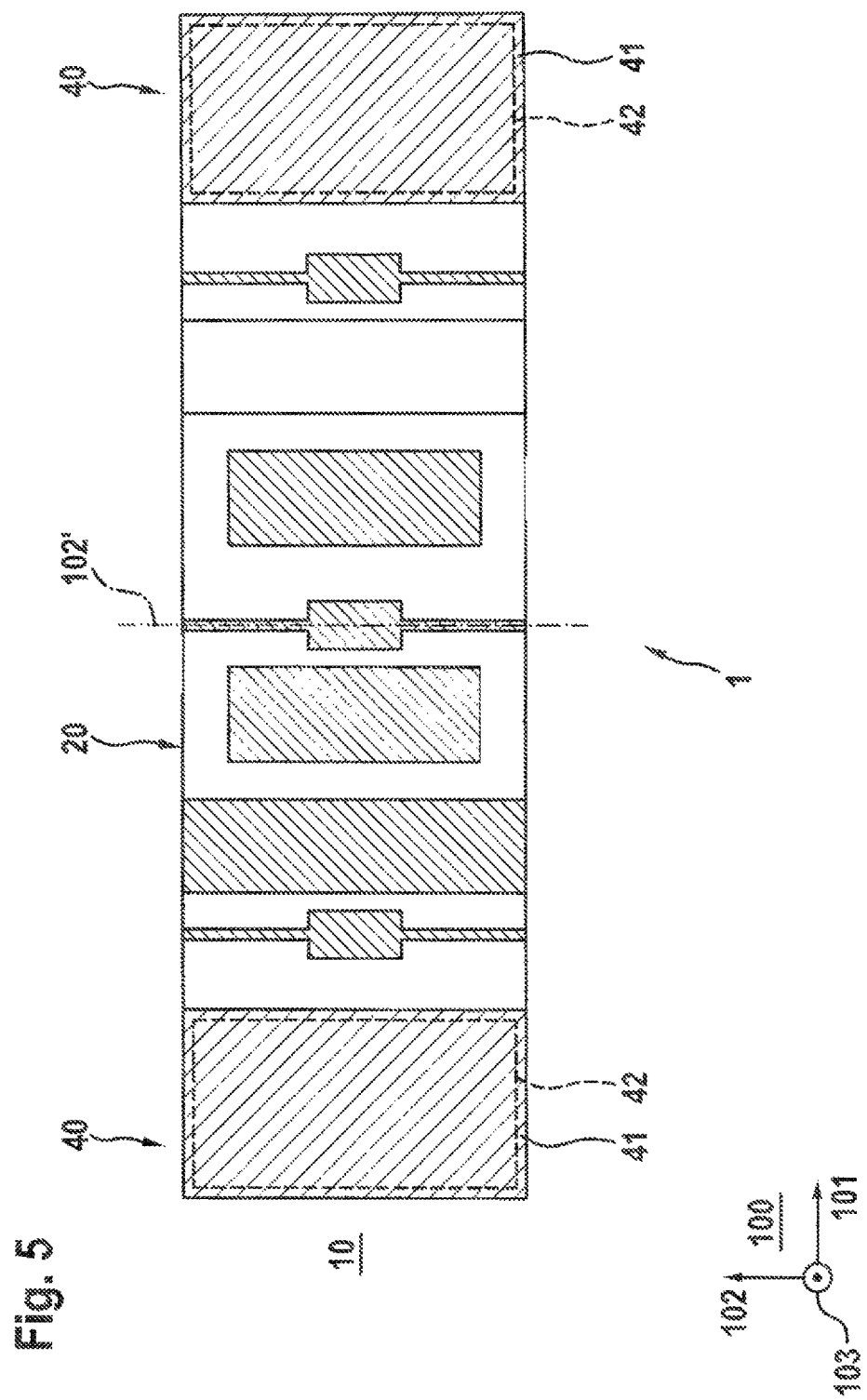
Figure 6:
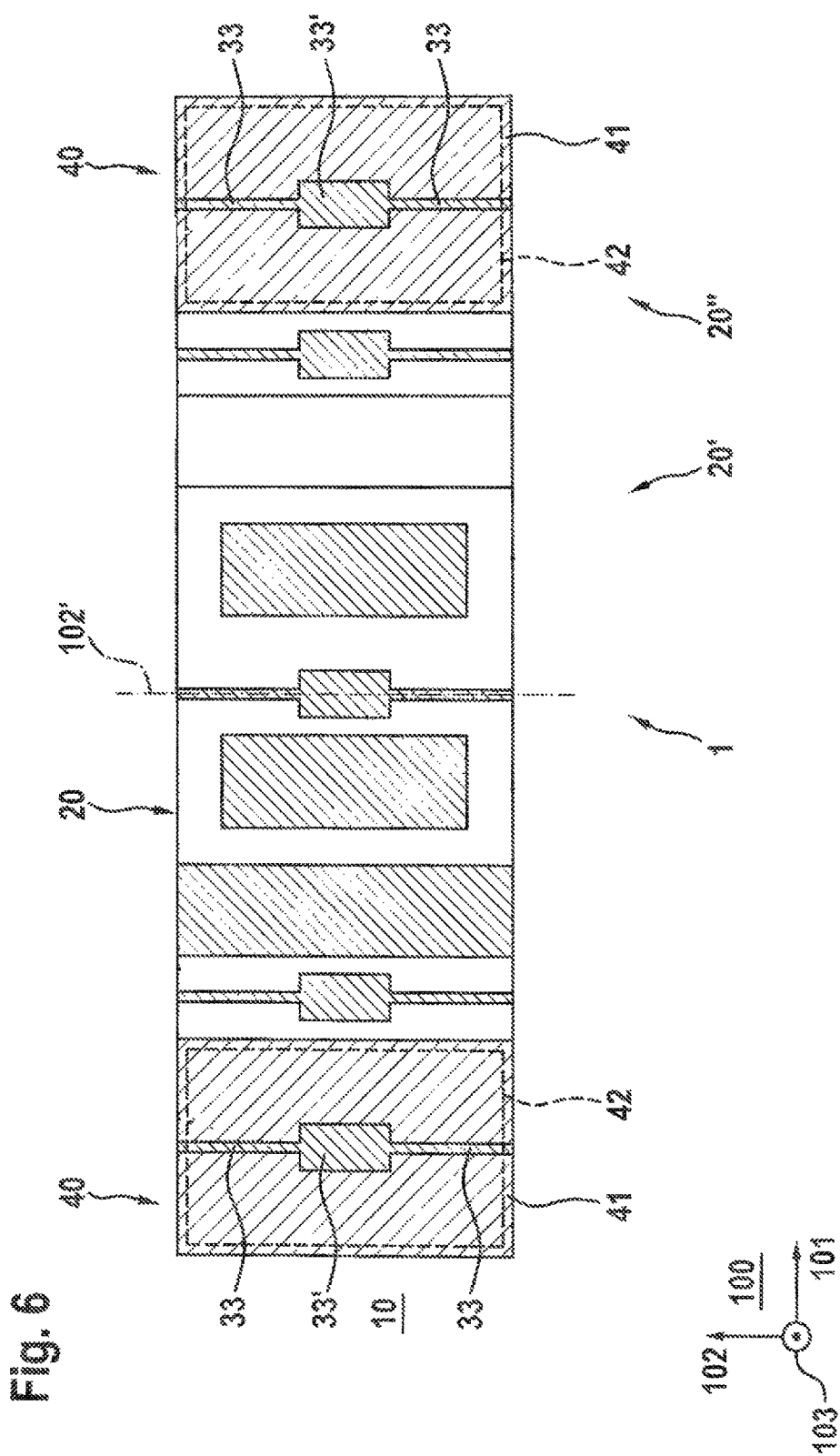

FIGS. 4 to 6 show various specific embodiments of a micromechanical sensor 1 according to the present invention in a top view, the specific embodiments shown here corresponding essentially to the specific embodiment described in FIG. 3.

FIG. 4 shows a micromechanical sensor 1 according to the present invention, movable element 20 here being fashioned as for example a rocker structure 20. Here, movable element 20 is situated on substrate 10 via a first spring element 31 anchored on substrate 10 over a first anchoring region 31', in particular a torsion spring 31, and is pivotable about axis of rotation 102'. In addition, movable element 20 has a first mass element 21 and a second mass element 22, first mass element 21 and second mass element 22 here having different masses. In particular, first mass element 21 and second mass element 22 here each have a center of gravity having an equally large distance from axis of rotation 102'. In addition, here first and second mass element 21, 22 are situated along a main direction of extension of movable element 20 that is essentially parallel to main plane of extension 100 and is essentially perpendicular to axis of rotation 102', in regions that are situated opposite one another relative to axis of rotation 102'. Here, the main direction of extension of movable element 20 extends parallel to X direction 101.

In addition, the movable element here has a damping structure 40 having a damping element 41, damping element 41 being integrated with movable element 20. In particular, damping structure 40 here has a further damping element 42 that is fixed to the substrate, i.e. is bound to substrate 10 over a binding point 42', damping structure 40 here being fashioned as an intermeshing comb electrode structure. Movable element 20 preferably includes two damping structures 40 situated along the main direction of extension of movable element 20 at oppositely situated ends of movable element 20. In this way, advantageously a sliding-film damping is realized so that the vibrational robustness is improved.

Quite particularly preferably, micromechanical sensor 1 here has a second spring element 32 anchored on substrate 10 over a second connection region 32'. In particular, micromechanical sensor 1 here has two second spring elements 32 that are situated opposite one another and/or mirror-symmetrically along the main direction of extension of movable element 20, relative to axis of rotation 102'. Preferably, the two second spring elements 32 are flexible springs that are configured for the targeted damping of particular frequencies of a disturbing oscillation.

FIG. 5 shows a micromechanical sensor 1 according to the present invention, the specific embodiment shown here essentially corresponding to the specific embodiment described in FIG. 4, the difference being that here damping structure 40 has two damping elements 41, 42 that extend essentially flatly, such that in the rest position they are parallel to main plane of extension 100. In particular, damping elements 41, 42 are here fashioned as damping electrodes. Further damping element 42 is here fixed to the substrate. In this way, advantageously a squeezed-film damping is realized so that vibrational robustness is improved.

FIG. 6 shows a micromechanical sensor 1 according to the present invention, the specific embodiment shown here corresponding essentially to the specific embodiments described in FIG. 4 or 5; here in addition a third spring element 33, in particular a flexible spring, anchored on the substrate over a third connection region 33', is connected to movable element 20. In particular, micromechanical sensor 1 here has two third spring elements 33 that are situated opposite one another and/or mirror-symmetrically along the main direction of extension of movable element 20, relative to axis of rotation 102'. Preferably, the two third spring elements 33 are flexible springs that are configured for the targeted damping of particular frequencies of a disturbing oscillation. Preferably, the two second and/or two third spring elements 32, 33 here each have lower spring rigidities than does first spring element 31.

Preferably, movable element 20 has an inner partial structure 20' and an outer partial structure 20", inner and outer partial structure 20', 20" forming a mass unit 20. Preferably, two outer partial structures 20" are situated along the main direction of extension of movable element 20, at oppositely situated ends of movable element 20. In particular, movable element 20 is fashioned in such a way that the movable element is flexibly bent during the deflection movement. This is for example realized through a comparatively small layer thickness or extension of movable element 20 along normal direction 103 or Z direction 103. Preferably, the two outer partial structures 20" each have a damping element 42, damping elements 42 each being configured for squeezed-film damping and/or sliding-film damping.

Figure 7:
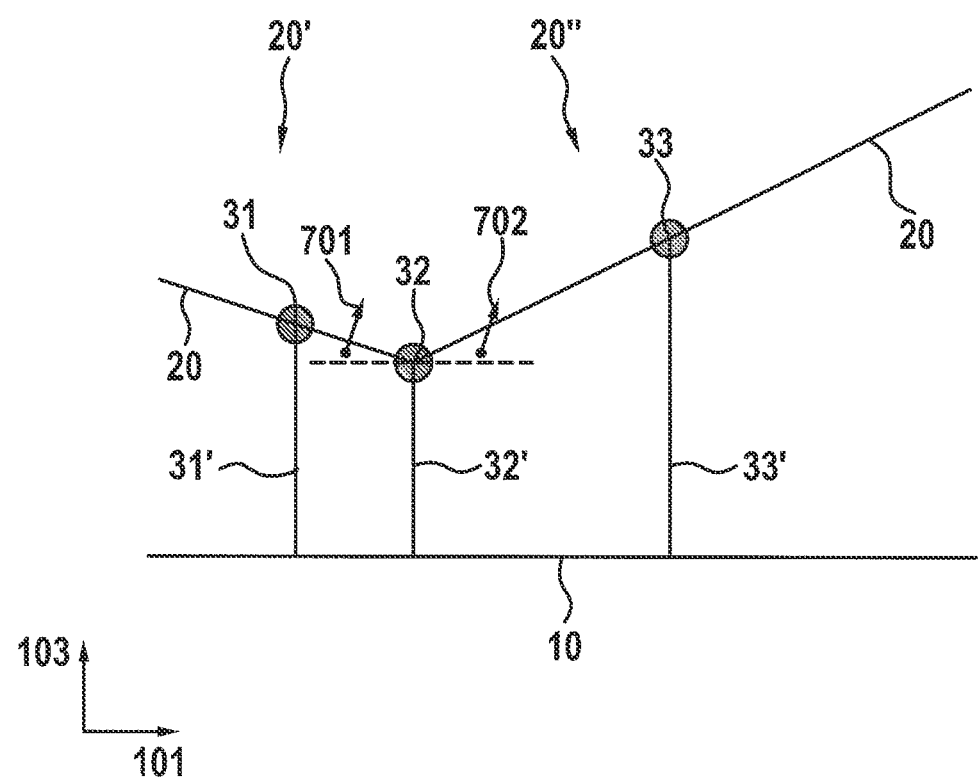

FIG. 7 shows micromechanical sensor 1 according to the present invention shown in FIG. 6, in a side view. Here, movable element 20 is bent in the region of second spring element 32, for example during the deflection movement; here this is represented as an angled bend. Here, inner partial structure 20' is bent by a first angle 701 relative to an X direction 101 essentially parallel to main plane of extension 100, and outer partial structure 20" is bent by a second angle 702 relative to an X direction 101 essentially parallel to main plane of extension 100.

What is claimed is:

1. A micromechanical sensor, comprising:
    a substrate having a main plane of extension and having a movable element that is pivotable about an axis of rotation that is essentially parallel to the main plane of extension, from a rest position into a deflected position, wherein the movable element has an asymmetrical mass distribution relative to the axis of rotation, so that, as a function of a force exerted on the movable element oriented essentially perpendicular to the main plane of extension, a deflection movement of the movable element is produced in the form of a pivot movement about the axis of rotation;
    a spring device via which the movable element is connected to the substrate; and
    a damping structure having a first damping element and being pivotable about the axis of rotation, wherein the damping structure is connected to the movable element via a further first spring device, the further first spring device connecting the damping structure to the movable element so that the damping structure is independently pivotable with respect to movable element, wherein at least one of:
        the first damping element is connected to the movable element so as to be capable of rotational movement, or
        the first damping element is integrated with the movable element.

2. The micromechanical sensor as recited in claim 1, wherein:
    the movable element includes a rocker structure,
    the rocker structure includes a first partial mass and a second partial mass,
    the first partial mass and the second partial mass are situated on different sides, relative to the axis of rotation along a direction that is essentially parallel to the main plane of extension and essentially perpendicular to the axis of rotation, and
    the first partial mass and the second partial mass have different moments of inertia relative to the axis of rotation.

3. The micromechanical sensor as recited in claim 1, wherein the spring device is configured to produce a resetting force as a function of a deflection of the movable element from the rest position.

4. The micromechanical sensor as recited in claim 3, wherein:
    the spring device has a first spring element anchored in a first anchoring region on the substrate, and
    the movable element is connected to the substrate via the first spring element so as to be rotationally movable about the axis of rotation.

5. The micromechanical sensor as recited in claim 4, wherein the first spring element includes a torsion spring.

6. The micromechanical sensor as recited in claim 4, wherein:
    the spring device has at least one of:
        a second spring element anchored on the substrate over a second anchoring region, and
        a third spring element anchored on the substrate over a third anchoring region, and
    at least one of the second anchoring region and the third anchoring region is situated at a distance, along a direction, at least one of from the first anchoring region and from one another.

7. The micromechanical sensor as recited in claim 6, wherein at least one of the first spring element and the second spring element is a flexible spring.

8. The micromechanical sensor as recited in claim 4, wherein:
    the movable element extends mainly essentially parallel to the main plane of extension,
    the spring device includes at least one of two second spring elements and two third spring elements, and
    at least one of the two second spring elements and the two third spring elements each being situated mirror-symmetrically to one another relative to the axis of rotation along a direction essentially parallel to the main plane of extension and essentially perpendicular to the axis of rotation.

9. The micromechanical sensor as recited in claim 4, wherein one of:
    the first damping element includes a symmetrical mass distribution relative to the axis of rotation, and
    the first damping element includes an asymmetrical mass distribution relative to the axis of rotation, mass centers of gravity of the movable element and of the first damping element being situated one of on the same side and at essentially oppositely situated regions, relative to the axis of rotation, along a direction.

10. The micromechanical sensor as recited in claim 9, wherein the further first spring element includes a further torsion spring.

11. The micromechanical sensor as recited in claim 1, wherein:
    the damping structure includes a second damping element, the second damping element is connected in stationary fashion to the substrate, the first and second damping elements each extends, in a rest position, essentially parallel to the main plane of extension, the first damping element and the second damping element are damping electrodes that interact capacitively with one another, and the damping electrodes are fashioned as one of intermeshing comb structures and surface electrodes that overlap along a direction of projection that is essentially perpendicular to the main plane of extension.

12. A method for producing a micromechanical sensor, comprising:

providing a substrate having a main plane of extension in a first production step, in a second production step, situating a movable element on the substrate in such a way that the movable element can be pivoted, about an axis of rotation essentially parallel to the main plane of extension, from a rest position into a deflected position, a mass distribution of the movable element relative to the axis of rotation being realized asymmetrically, wherein the movable element is connected to the substrate via a spring device;

in a third production step, situating a damping structure having a damping element in such a way that the damping element is pivotable about the axis of rotation, wherein the damping structure is connected to the movable element via a further first spring device, the further first spring device connecting the damping structure to the movable element so that the damping structure is independently pivotable with respect to movable element; and at least one of:
    connecting the damping element to the movable element so as to be capable of rotational motion, or
    integrating the damping element with the movable element.

* * * * *